June 28, 1960     F. R. HIGLEY     2,942,384
SURFACE-TREATING TOOL
Filed June 28, 1954
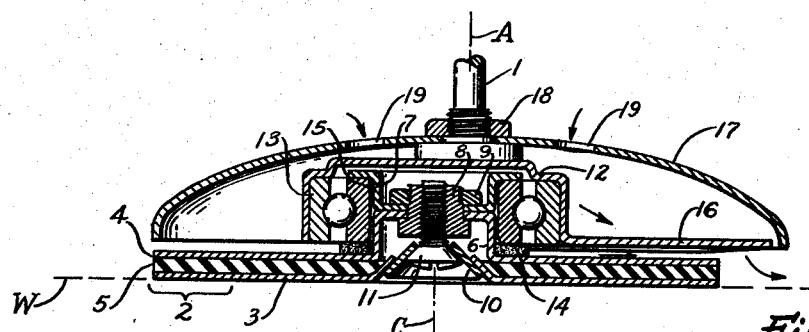
Fig. 1
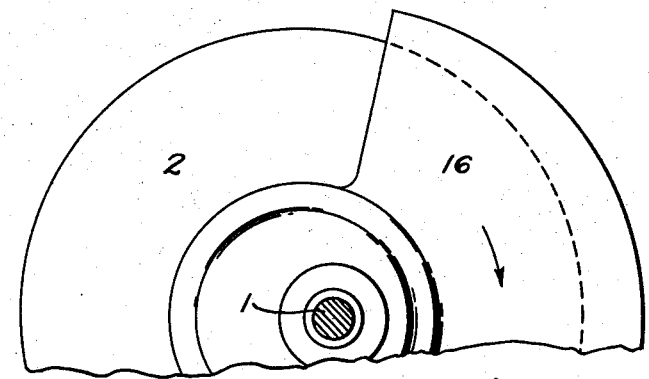
Fig. 2
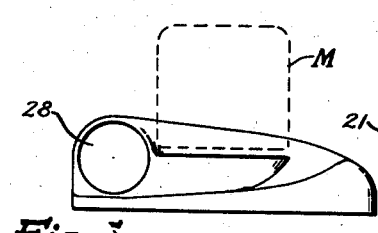
Fig.
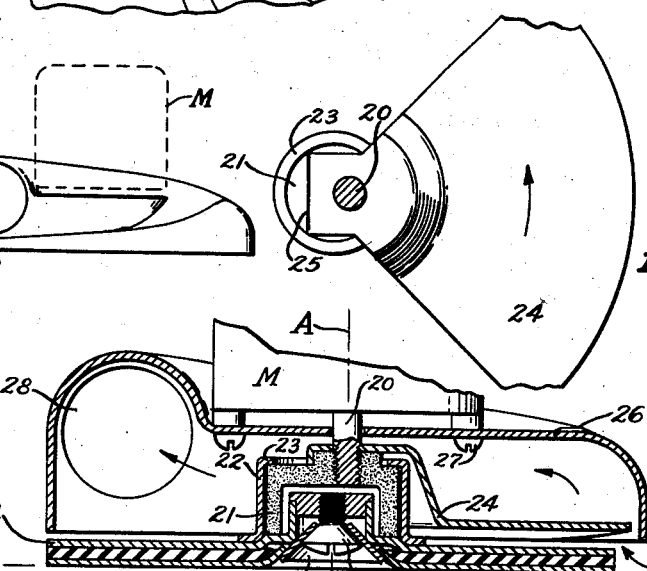
Fig. 4
Fig. 3
INVENTOR,
Frank R. Higley

United States Patent Office 2,942,384
Patented June 28, 1960

2,942,384

SURFACE-TREATING TOOL

Frank R. Higley, 3009 Fairfax Road,
Cleveland Heights 18, Ohio

Filed June 28, 1954, Ser. No. 439,705

14 Claims. (Cl. 51—170)

This invention relates to power-driven tools for surface-treating such as by sanding, polishing, rubbing or other treatment involving characteristics of abrasion.

More particularly the invention relates to such a tool wherein a tool head characterized by a flat working face, is driven relative to an axis by means such that each unit area on the face will have a gyratory motion, generally circular and of small diameter relative to the size of the face.

The tool head may be circular and mounted for rotation about its own axis coincident with its movement about the axis of its drive, in which arrangement the unitary gyratory motion may be accompanied by a gradual advancement, generally about both axes.

In any event the tool head contemplated has movement for its face wherein peripheral portions thereof alternately cover and uncover corresponding portions of the work, with cyclic progression of such portions to define an endless strip of work surface adjacent the periphery of the face.

This application is a continuation-in-part of my copending application Serial No. 159,700, filed May 3, 1950, for "Power-Driven Surface-Treating Tool," issued April 26, 1955, as Patent No. 2,706,875.

The invention herein contemplates means for counterbalancing the eccentricity of the tool head, and includes as an object an arrangement causing such counterbalance means to act also as air-moving vane or blade means for assisting in maintaining the work and tool head clear of abrasion products during tool operation.

A further object of the invention is to arrange the vane means to have such timed relation to the tool head motion as to always have maximum effectiveness at that portion of the strip of work surface which is instantaneously uncovered in the operation of the tool.

Another object of the invention is to provide multi-purpose canopy means cooperative in a novel manner with other parts of the tool to serve as guard means for protection of the operator from moving parts, as guide means for manipulating the tool along edges of work surface, as directing means for the discharge of the vane means, as valve means cooperative with the tool head, and as collector means for products of abrasion.

The invention is adapted for employment, by slight modification, either as an attachment mounted in the chuck of an "electric drill" or as a part of a unitary power tool including an electric motor or other means of drive.

The invention contemplates employment of crank and bearing means in the drive of the tool face with cooperative driving and driven hub members, one disposed about the other; and general objects of the invention are to provide simple, reliable, and inexpensive means for the purposes described.

Further objects, including a novel manner of operation, will be apparent from the following taken in connection with the accompanying drawings, wherein Fig. 1 is a view in sectional elevation of an exemplification of the invention, adapted for employment for mounting in the chuck of an electric drill;

Fig. 2 is a plan view of parts appearing in Fig. 1, with the canopy thereof removed;

Fig. 3 is a view corresponding to Fig. 1, but showing a modification adapted for employment with a driving motor as unitary therewith;

Fig. 4 is a plan view showing the vane means appearing in Fig. 3, together with its immediately associated parts; and Fig. 5 is a view in elevation corresponding to Fig. 3.

With reference now to Figs. 1 and 2 of the drawings, 1 is a shaft disposed on an axis A about which it is driven and upon which it is supported, as by mounting in the chuck of an electric drill. 2 indicates generally a tool head here shown as in the form of a composite disc, faced with sandpaper 3, and having a metal backing 4 with an intermediate layer of rubber 5. The metal backing 4 has a central hub portion 6 secured with a companion hub member 7 as by bushing 8 and nut 9, and the facing 3 is removably secured as by a conical clamp washer 10 and screw 11 threaded into the nut 8.

The tool head parts described are concentric about axis C, which is parallel to but slightly offset from the axis A.

For drive of the parts which are concentric with the axis C, about the axis A, crank and bearing means are provided. As here shown, these include a hollow hub portion 12 concentric with the axis C and consequently eccentric of the axis A.

A ball bearing, generally indicated at 13, is provided to be effective between the driving hub 12 on the shaft 1, and the driven hub formed by the portions 6 and 7 of the tool head. The outer race of the ball bearing may be a press fit in the driving hub 12.

The tool head is secured to the inner race of the ball bearing, at its upper end by the outturned flange of the member 7 and at its lower end there is provided a self-lubricating thrust washer 14 as of impregnated porous metal. If desired, there may be slight radial clearance between the inner race of the ball bearing and the members 6 and 7, as indicated at 15, to permit them slight lateral relative displacement.

It will be apparent that upon rotational drive of the shaft 1, the screw 11 will be moved as a crank about the axis A, and the tool head will have corresponding bodily movement. At the same time the tool head parts concentric with the axis C are free to be moved thereabout by the reaction of the tool face against the work surface, indicated at W.

Thus during such operation, unit areas of the face will have a gyratory motion, generally circular and of small diameter relative to the size of the face, the radius of gyration being substantially the distance between the axes A and C. Lateral clearance at 15, if provided, will correspondingly reduce such radius and introduce a component of advancement of the tool head about the axis C, in the direction opposite to that of drive of the shaft 1.

Peripheral portions of the tool head will alternately cover and uncover corresponding portions of the work surface, with cyclic progression of such portions to define an endless strip of work surface adjacent the periphery of the face.

For counterbalance of the eccentrically moving parts a member 16 preferably of generally sectorial outline is provided extending from the axis A oppositely to the offset direction of the Axis C, substantially to the periphery of the path of movement of the tool head face. The outer extremity of the member 16 will thus always be disposed over a portion of work surface instantaneously uncovered by the tool head. The counterbalance member 16 is arranged to be driven by the shaft 1, concentrically therewith and for the purpose may form an integral extension of the driving hub member 12. Its arcuate portion is slightly inclined or canted to serve as air moving vane means by producing downward flow of air, as well as acting as counterbalance.

Due to the timed relation between the vane means and the tool head face the location of maximum air flow will progress about the axis A along the cyclically uncovered endless strip of work surface at the uncovered portion thereof. Thus products of abrasion will be moved by the air stream away from the tool head.

A multipurpose canopy 17 is provided. The canopy is of circular form rotatably mounted on the shaft 1 with which it is concentric, as by the loose nut 18. The peripheral extremity of the canopy extends as a mouth closely adjacent to the extremity of the path of movement of the tool head face, the tool head itself, and the work surface; and the canopy encloses the described crank and bearing parts, and the vane 16. The canopy is provided with openings 19 adjacent the shaft 1 for flow of air inwardly, so that in operation air flow will be as indicated by the arrows, Fig. 1, directed by the canopy to cool the tool head and disperse products of abrasion from the tool head.

It may be noted that in such operation, the tool head and the canopy cooperate somewhat as a valve and valve body respectively. At the peripheral location opposite the vane 16, corresponding portions of the tool head and canopy are disposed closely adjacent each other to impede air flow and thus in effect assist flow adjacent the vane.

Since the canopy extends commensurate with the area of tool head movement, it may also serve as guide means for operation of the tool along a bounded edge of work surface, with rotation of the canopy about the shaft 1.

With reference now to Figs. 3 to 5 of the drawings, a motor M is provided having an output shaft 20 on which is secured an eccentric hub member 21 having a cylindrical periphery concentric with the axis C which is parallel to the axis A of the motor shaft 20. The hub member 21 may be of porous metal impregnated with lubricant and threaded onto the end of the shaft 20.

The working face and associated parts of the tool head may be generally as before described including the washer 10 and screw 11. An outer bearing member 22, to be eccentrically driven by the member 21 is secured to the backing 4 of the tool head, as by welding and includes a flange 23 slightly overlying the top surface of the hub member 21 to maintain the assembly.

There may be the slight lateral clearance indicated in Fig. 3 between the driving hub member 21 and its driven bearing 22 to increase the component of progression of the tool head in its operation. Such progression will be in the direction of drive of the shaft 20 since the driving hub member 21 is here within its cooperative driven member 22, as distinguished from the arrangement of Figs. 1 and 2.

For counterbalance of the eccentrically driven parts, a sectorial member 24 is provided, effectively keyed to the shaft 20 as by a lip 25 bearing against a cooperative shoulder on the hub member 21, and secured against the member 21 as by a slight shoulder on the shaft 20 at the base of its threads.

The outwardly extending portion of the member 24 is slightly inclined as indicated in Fig. 3, to act as vane means for producing air flow. The direction of inclination, however, is here such as to cause flow upwardly, instead of downwardly as before. The vane 24 as before, extends from the shaft 20 to the extremity of the path of movement of the work face of the tool so that it overhangs such face to always be effective on the instantaneously uncovered part of the work surface.

A multipurpose canopy 26 is provided, secured to the frame of the motor M as by screws 27. The canopy 26 has an opening to receive the shaft 20, extends therefrom to enclose the moving parts, with its peripheral extremity providing a mouth closely adjacent the periphery of the area defined by movement of the tool head face.

As particularly indicated in Fig. 5, the canopy 26 is in the form of a volute, leading to a tangential outlet opening 28 which may be disposed generally in a plane which includes the driving axis A. Thus, in operation of the tool, air flow will be caused in the direction of the arrows, Fig. 3, to draw products of abrasion into the hollow of the canopy and discharge them out through the opening 28; the volute conformation of the canopy being effective for some conversion of air velocity energy into pressure energy, as well as deliver to its concentrated outlet, the stream received as generally distributed about its periphery although always instantly concentrated at one peripheral location.

For disposal of the products of abrasion discharged at the opening 28, a light flexible tubing may be suitably secured with one end at the opening and the other end extending out beyond a window opening of the space within which the tool is being employed. Or, of course, a dust collecting bag or the like might be employed in connection with the opening 28.

Arrangement for air flow in generally outward direction, as indicated in Figs. 1 and 2, is preferable for a tool intended for outdoor operation, whereas inward air flow, as indicated in Figs. 3 to 5 is preferable for indoor operation. Which bearing hub member of the crank means is disposed about the other effects only the direction of progression of the eccentrically mounted means relative to the direction of drive of the input shaft.

Whereas the examples herein specifically illustrated and described disclose a tool head having a circular working face and canopy, with simple crank means for effecting gyratory drive of the tool head, the invention is not so confined. For example, the tool head face might be of rectangular outline, its gyratory drive effected by other means, its canopy fixed and so formed that its mouth is generally rectangular and disposed adjacent the periphery of the area of movement defined by the face; and its counterbalancing vane means disposed for movement within the canopy, including overhang of a portion of the path of travel of the tool head, and inclined as desired relative to the direction of drive, to produce air flow either inwardly or outwardly of the area instantly uncovered by the working face of the tool—all as will be appreciated by one familiar with the art.

Also, it may be observed that the air flow which, according to this invention, sweeps the work surface for clearing products of abrasion therefrom, is always concentrated at a portion of such surface which is instantly uncovered by the tool head face, being in the nature of a jet spurt, gush or surge at that location; although itself constant as it progresses about the driving axis of the tool.

I claim:

1. In the operation of a tool head having a face adapted to bear against work for abrasive treatment thereof, with drive of the tool head to produce a path of motion for said face wherein peripheral portions thereof alternately cover and uncover corresponding portions of the work, with cyclic progression of such face portions to define an endless strip of work surface adjacent the periphery of said face: the method of clearing products of abrasion from said strip, comprising providing an air stream concentrated across a portion of said strip, with cyclic progression of said stream along said strip to be effective on said strip portions as they are instantly uncovered.

2. A tool of the class described including a tool head having a face adapted to bear against work for abrasive treatment thereof, means for driving said tool head to produce a path of movement for said face wherein peripheral portions thereof alternately cover and uncover corresponding work portions, with cyclic progression of said face portions to define an endless strip of such work portions adjacent the periphery of said face, canopy means for said tool head and having a mouth disposed adjacent the outer periphery of said strip, and means to provide an air stream into said canopy means mouth concentrated across that portion of said strip instantly uncovered by said face.

3. A tool of the class described including a tool head having a face adapted to bear against work for abrasive treatment thereof, means for driving said tool head to produce a path of movement for said face wherein peripheral portions thereof alternately cover and uncover corresponding work portions, with cyclic progression of said face portions to define an endless strip of such work portions adjacent the periphery of said face, canopy means for said tool head and having a mouth disposed adjacent the outer periphery of said strip, and means located within said canopy to provide an air stream into said canopy means mouth concentrated across that portion of said strip instantly uncovered by said face.

4. A tool of the class described including a tool head having a face adapted to bear against work for abrasive treatment thereof, means for driving said tool head to produce a path of movement for said face wherein peripheral portions thereof alternately cover and uncover corresponding portions of said work, with cyclic progression of said face portions to define an endless strip of such work portions adjacent the periphery of said face, canopy means for said tool head and having a mouth disposed adjacent the outer periphery of said strip, and means located within said canopy to provide an air stream into said canopy means mouth concentrated across that portion of said strip instantly uncovered by said face and for the purpose arranged for cyclic progression along said strip in timed relation to the progression of said uncovered portion thereof.

5. In a surface treating tool including tool head means disposed about a center, with a face endwise of said center adapted to bear against the work for surface treatment thereof: crank means including complementary drive shaft and driven eccentric means providing a throw which is slight relative to said face, said tool head means being mounted on said eccentric means, air-moving vane means rigidly associated with said crank means and counterbalancing the parts eccentric relative to the axis of said drive shaft, and canopy means substantially enclosing the paths of movement of said tool head and vane means, and having a mouth arranged to extend adjacent said work about the path of said face.

6. In a surface treating tool having circular tool head means having a face adapted to bear against the work for surface treatment thereof: means for driving said tool head to produce a motion thereof eccentric of an axis adjacent its own center, and circular canopy means arranged concentrically of and rotatable about said axis, to be effective over both said tool head and the work surface portion therebeyond affected by said motion.

7. In a surface treating tool: circular tool head means having a face adapted to bear against the work for surface treatment thereof, means for driving said tool head to produce a motion thereof eccentric of an axis, circular canopy means arranged concentrically of said axis to be effective over the path of motion of said tool head, and counterbalance means for the eccentrically operating parts, located for operation about said axis between said tool head means and said canopy means, in a path extending within said canopy beyond said tool head and thereadjacent.

8. In a surface treating tool: circular tool head means having a face adapted to bear against the work for surface treatment thereof, means for driving said tool head to produce a motion thereof eccentric of an axis, circular canopy means arranged concentrically of said axis to be effective over the path of motion of said tool head, and the work surface portion affected by said motion, and counterbalance means for the eccentrically operating parts, located for operation about said axis between said tool head means and said canopy means, said counterbalance being arranged to produce a concentrated air movement across work surface portions within said canopy means when instantly uncovered by said tool head face.

9. In a surface treating tool: circular tool head means having a face adapted to bear against the work for surface treatment thereof, means for driving said tool head to produce a motion thereof about an axis to which said face is eccentric, circular canopy means arranged concentrically of said axis to be effective over the path of motion of said tool head, and the work surface portion affected by said motion, and counterbalance means for the eccentrically operating parts, located for operation about said axis between said tool head means and said canopy means, said counterbalance including vane means extending adjacent the mouth of said canopy means to there produce concentrated inward air movement across work surface portions within said canopy means as uncovered by said tool head face, said canopy means having a volute form with a tangential outlet opening for flow caused by said vane means, and means securing said canopy means against movement about said axis.

10. In a surface treating tool: tool head means having a face adapted to bear against the work for surface treatment thereof, means for driving said tool head to produce a motion thereof eccentric of an axis, canopy means arranged about said axis to be effective over the path of motion of said face, and counterbalance means for said tool head arranged for operation within said canopy means about said axis, said counterbalance means including vane means extending from said axis beyond said face and there arranged to produce concentrated air flow having components parallel to said axis.

11. In a surface treating tool: tool head means having a circular face adapted to bear against the work for surface treatment thereof, means for driving said tool head to produce a motion thereof about an axis to which said face is eccentric, canopy means arranged concentrically of said axis to be effective over the path of motion of said face, and counterbalance means for said tool head arranged for operation within said canopy means about said axis, said counterbalance means including vane means extending from said axis beyond said face and there arranged to produce concentrated air flow having components parallel to said axis.

12. In a surface treating tool: tool head means having a circular face adapted to bear against the work for surface treatment thereof, means for driving said tool head to produce a motion thereof about a driving axis to which said face is eccentric while permitting said head motion about its own axis, canopy means arranged concentrically of said axis to be effective over the path of motion of said face, and counterbalance means for said tool head arranged for operation within said canopy means about said driving axis, said counterbalance means including vane means extending from said driving axis beyond said face and there arranged for cooperation with said canopy means to produce concentrated air flow having components toward said driving axis and from the work.

13. In the operation of a tool head having a face adapted to bear against work for abrasive treatment thereof, the method of driving the tool head to produce a path of motion for said face wherein periodically a edge portion thereof alternately covers and uncovers a portion of the work, and clearing products of abrasion from said work, by providing an air stream across said work portion, concentrated in timed relation to the movement of said face as said work portion is instantly uncovered thereby.

14. In the operation of a tool head having a face adapted to bear against work for abrasive treatment thereof, the method of driving the tool head to produce a path of motion for said face wherein periodically an edge portion thereof alternately covers and uncovers a portion of the work, and clearing products of abrasion from said work, by providing an air stream across said work portion and toward said tool head, concentrated in timed relation to the movement of said face as said work portion is instantly uncovered thereby.

References Cited in the file of this patent

UNITED STATES PATENTS

| | | |
|---|---|---|
| 2,143,970 | Blood | Jan. 17, 1939 |
| 2,204,178 | Gartner | June 11, 1940 |
| 2,290,533 | Campbell | July 21, 1942 |
| 2,478,074 | Atkin | Aug. 2, 1949 |
| 2,639,564 | Atkin | May 26, 1953 |
| 2,683,336 | Scace | July 13, 1954 |
| 2,706,875 | Higley | Apr. 26, 1955 |

FOREIGN PATENTS

| | | |
|---|---|---|
| 652,046 | France | Oct. 16, 1928 |